US005549375A

United States Patent [19]

Pagliaccio

[11] Patent Number: 5,549,375
[45] Date of Patent: Aug. 27, 1996

[54] COMPUTER STORAGE DRAWER SYSTEM

[76] Inventor: Joseph A. Pagliaccio, 11 2nd Ave., Bayville, N.Y. 11709

[21] Appl. No.: 337,889

[22] Filed: Nov. 14, 1994

[51] Int. Cl.⁶ .................................................. A47B 88/16
[52] U.S. Cl. .............. 312/319.1; 312/333; 312/334.44; 312/330.1; 312/223.2; 361/685; 361/725; 361/683; 361/684; 361/727
[58] Field of Search ........................ 312/319.1, 319.2, 312/257.1, 400, 330.1, 333, 334.44, 223.2; 361/725, 727, 683, 684, 685

[56] References Cited

U.S. PATENT DOCUMENTS

| | | | |
|---|---|---|---|
| 1,469,359 | 10/1923 | Craw | 232/1 E |
| 4,024,954 | 5/1977 | Staar | 312/319.1 X |
| 4,231,626 | 11/1980 | Amtmann et al. | 312/245 X |
| 4,428,480 | 1/1984 | Ackeret | 312/333 X |
| 4,655,344 | 4/1987 | Acker | 312/333 X |
| 4,660,900 | 4/1987 | Poterlini | 312/319.1 X |
| 4,712,843 | 12/1987 | Castelli et al. | 361/685 |
| 4,739,445 | 4/1988 | Tragen | 361/725 X |
| 4,875,584 | 10/1989 | Ackeret | 312/319.1 X |
| 4,937,771 | 6/1990 | Rumps, Jr. et al. | |
| 5,004,306 | 4/1991 | Oshida | 312/319.1 |
| 5,080,452 | 1/1992 | Tuckman | |
| 5,171,075 | 12/1992 | Nagano et al. | 312/319.1 X |
| 5,182,438 | 1/1993 | Oakes et al. | 219/386 |
| 5,262,923 | 11/1993 | Batta et al. | 312/334.44 X |
| 5,319,519 | 6/1994 | Sheppard et al. | 361/685 |
| 5,363,961 | 11/1994 | Bieck et al. | 312/319.1 X |

Primary Examiner—Peter M. Cuomo
Assistant Examiner—Rodney B. White

[57] ABSTRACT

A storage drawer system for use hi conjunction with any standard computer that makes use of empty drive bays for the purpose of conveniently storing computer and non computer related items, such as disks, CDs and manuals. The storage drawer system comprises a drawer that can be opened and closed, and a housing to support the drawer operation and to prevent any foreign object from entering the internals of the computer.

1 Claim, 2 Drawing Sheets

U.S. Patent    Aug. 27, 1996    Sheet 1 of 2    5,549,375
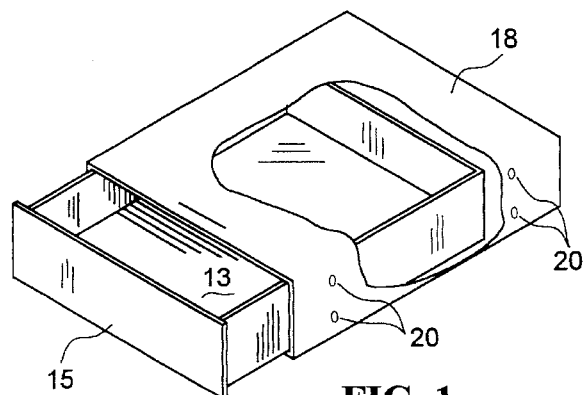
FIG. 1
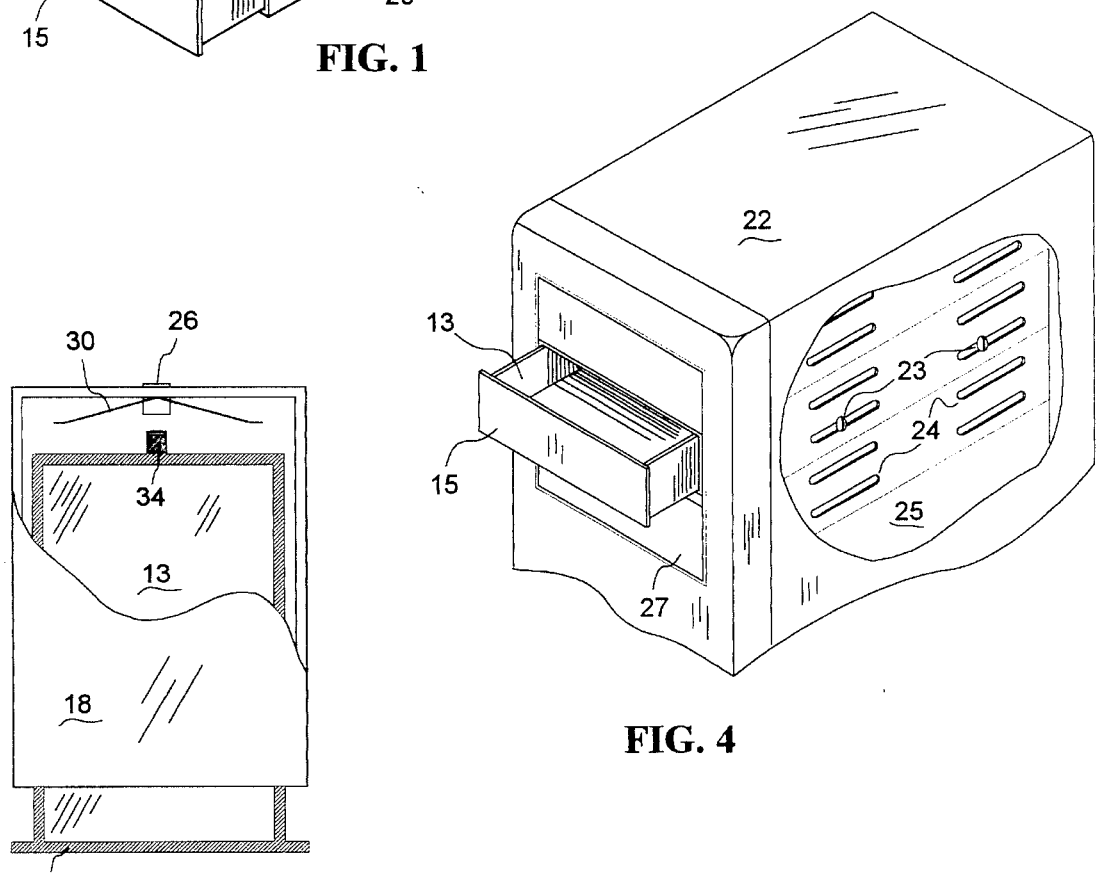
FIG. 2
FIG. 4
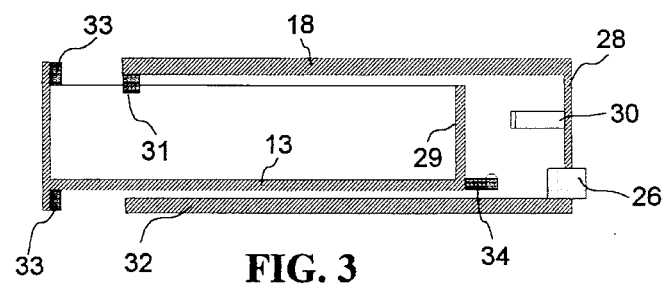
FIG. 3

COMPUTER STORAGE DRAWER SYSTEM

FIELD OF THE INVENTION

The present invention relates to computers, and more particularly to a storage drawer system designed to be installed into a computer's drive bay.

BACKGROUND OF THE INVENTION

Computers continue to grow smaller but they commonly require large amounts of desk space for monitors, keyboards and mice. Computers also have their own special supplies. For example, diskettes, keys, tools, manuals, and other reference materials are often used in conjunction with personal computers.

As a result manufacturers offer storage devices, such as disk organizers, and diskette cases that attach to the outside of a computer monitor or sit on a desk to store floppy disks. These however, are poor locations and methods for storing computer disks. These methods take up valuable desk space and can allow disks to get damaged with dust and dirt or get bent and become unusable. Also, these devices are bulky and are not necessarily attractive.

Additionally, computer cases are commonly equipped with two types of bays for the installation of computer devices. One type is for devices that do not require user access, such as a hard disk, and the other for devices that do require user access. The bays that do require user access are used to house various removable media devices including floppy drives, compact disk drives and tape drives. These bays come in two standard sizes that roughly accommodate 3½ inch media and 5¼ media.

The removable media device bay is internal to the computer case where access is provided via removable faceplate that is discarded when a device is installed. The bay is physically a hollow cavity where devices can be attached to the computer chassis. A computer used for home or office use, such as the common Personal Computer, can have one or more these bays. In a typical personal computer configuration one or more of these bays are often unused. The unused bay becomes an ideal location to install the computer storage drawer system.

BRIEF SUMMARY OF THE INVENTION

It is an object of this invention to provide a convenient storage compartment for the computer user by means of a storage drawer system that is specifically designed to be used in conjunction with the unused drive bay of a standard computer case.

Another object of this invention is to provide a secure, contaminant free and optionally lockable storage compartment for computer items such as disks and reference materials.

A further object of the present invention is to provide a storage drawer system that can be easily installed and removed.

Still another object of the present invention is to provide a storage drawer system that can be installed in any standard computer case.

A still further object of the present invention is to provide a storage drawer system that is easily manufactured.

The first embodiment of the present invention is a computer drawer system that fits into the removable media drive bay of a computer that can be opened and closed and thus used to store computer and non computer related items. The drawer system is comprised of two major components, a housing and a drawer. The housing and the drawer may be constructed of metal, plastic or any other suitable material.

The housing functions as an outer sleeve for the drawer, it is five sided, open at the face and has seams that are air tight. When installed the housing prevents contaminants from entering the internals of the computer case and prevents the contents of the drawer from leaving the drawer. The housing is attached to the chassis of the computer case in the same manner that industry standard devices are installed. This is accomplished by the use of screws and threaded holes located in the sides of the housing. These holes are configured to be aligned to standard computer case drive bay holes. The housing has the minor components of a latch that holds the drawer securely in place when closed, and a spring that presents the drawer when the latch is released. The latch and the spring are located on the back wall internal to the housing.

The drawer fits into the housing cavity. It slides open and closed guided by inner walls of the housing while resting on the floor of the housing. The faceplate of the drawer is used for cosmetics, to provide a contaminant proof seal, and to mount an optional locking mechanism or opening mechanism.

In a second embodiment of the present invention, the housing is replaced with a top and rails that are integral to the drawer and support the drawer operation. This sort of arrangement may be less expensive to manufacture but does not both restrict foreign elements to the inside of the computer case and at the same time allow for drawer removal.

In a third embodiment of the present invention, the drawer is replaced with a door attached to the front of the housing. The door then provides access to the housing cavity and allows for a secure storage location.

BRIEF DESCRIPTION OF THE DRAWINGS

FIG. 1 is an perspective view of a first preferred embodiment of the computer storage drawer system showing the drawer and the housing with the drawer partially extended;

FIG. 2 is a top plan view thereof;

FIG. 3 is cross-sectional view thereof;

FIG. 4 is a partial perspective view of the drawer system installed in a typical computer with the drawer partially extended;

DETAILED DESCRIPTION OF THE INVENTION

Figure 5:
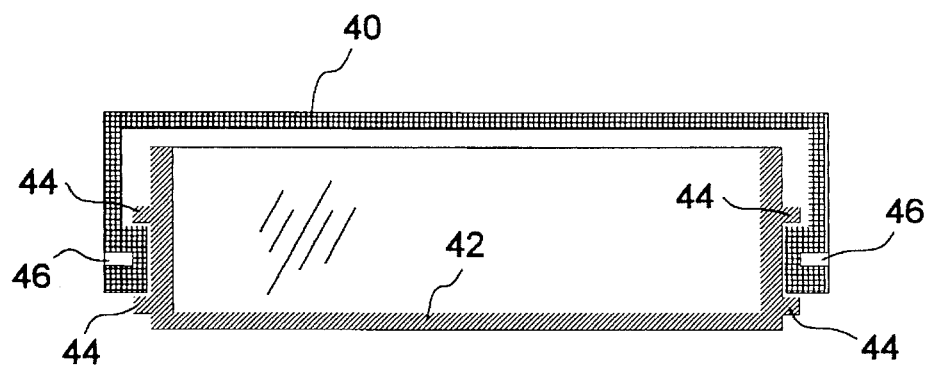
FIG. 5 is a cross-sectional view of a second preferred embodiment.

Referring now to the drawings, wherein like reference numerals designate identical or corresponding parts throughout several views, FIGS. 1 through 4 illustrate the first preferred embodiment of the invention in which a drawer 13 fits integrally into a housing 18.

The housing 18 is mounted internally into a drive bay 27 and attached to the chassis 25 of a standard computer case 22 using screws 23 that first pass through holes 24 in the computer chassis 25 and than into threaded holes 20 in the housing 18. The proportions of the housing 18 and the location of the threaded holes 20 are such that the invention can be mounted in the drive bay of all standard computers. As previously discussed the housing 18 functions as a sleeve to the drawer 13. It is five sided, open only at the face and thus prevents unwanted items from entering the internals of the computer 22 and prevents contaminants from entering the inside of the drawer cavity when the drawer 13 is closed. The housing walls are constructed to maximize the size of the drawer 13 and also provide strength to support the drawer's operation. The drawer 13 and the weight of it's contents rests and slides on the housing floor 32. Computer disks, tapes and CDs are typical contents. Additionally, mounted on the inside rear wall 28 of the housing 18 are the spring 30 that presents the drawer 13 when unlatched, and the latch 26 that secures the drawer 13 in place when not in use. The spring 30 compresses between the rear wall 29 of the drawer 13 and the rear wall 28 of the housing 18. The housing 18 also has a projection 31 on it's top wall that prevents the drawer 13 from falling out. The projection 31 will allow the removal of the drawer 13 if the drawer is extricated at a positive angle.

The drawer 13 is also five sided and is open at the top. It has a faceplate 15 that is attached on the front face of the drawer 13 or an integral part of the drawer 13. The faceplate 15 is used for cosmetics and to provide the proper seal with the housing 18. When used in harsh environments the faceplate 15 can incorporate a gasket 33 that further prevents contaminants from entering the drawer 13. The gasket 33 could be used on factory floor computers that are usually shop hardened but do not provide a location to store disks. The drawer 13 also incorporates the striker 34 for the latch mechanism 26. Optionally a lock assembly or opening mechanism such as a common pull knob can be integrated into the faceplate 15.

A perspective view of second preferred embodiment is shown in FIG. 5 where the five sided housing 18 of FIG. 1 is replaced with a three or four sided housing 40 that includes a top that prevents items from leaving file drawer cavity when the drawer 42 is closed, and a drawer 42 that includes integral tracks or rails 44 that support the drawer 42 operation and provide attachment points 46 for installation. This embodiment may be less costly then the first preferred embodiment to manufacture.

Figure 6:
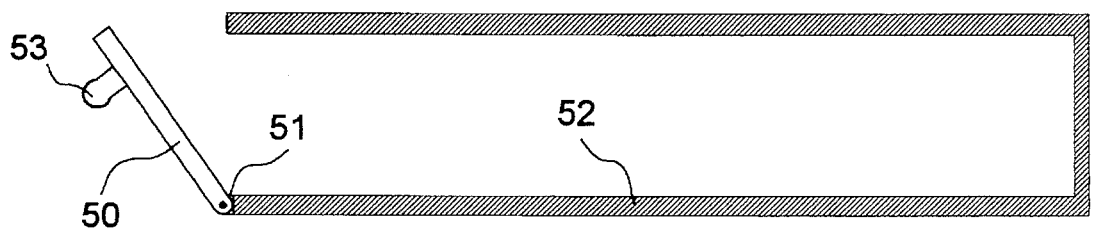
FIG. 6 is a perspective view of the third preferred embodiment.

FIG. 6 illustrates the third preferred embodiment where the drawer 13 of FIG. 1 is replaced with a door 50 and pull knob 53 that is attached with a spring loaded hinge 51 to the front of the housing 52. The door 50 then provides access to the housing 52 cavity and allows for a secure storage location for computer disks, computer documentation and the like.

Thus, there has been described a storage drawer system for use in conjunction with computers that fits into a standard computer and that can be open and closed and used to store computer and non computer related items. Several embodiments and variations of the present invention have been disclosed and it is to be understood that additional embodiments and variations will be obvious to those individuals skilled in the art. The embodiments described herein together with those additional variations are considered to be within the scope of the invention.

I claim:

1. An apparatus for storing items within a cabinet of a computer comprising:

a housing having a top wall, a bottom wall, two opposing side walls and a rear wall thereby leaving a front opening; and a drawer including a front panel, a rear wall, two opposing side walls and a bottom wall, the drawer able to be fitted within the housing and slideably positionable between an open and a closed position, wherein the front panel includes a means for sealing the housing opening to prevent contaminants from entering the drawer when the drawer is in the closed position, the apparatus further including a latching means for releasably maintaining the drawer in a closed position, the latching means comprising a first latch portion positioned on an outside surface of the rear wall of the drawer and a mating second latch portion correspondingly positioned on an inside surface of the rear wall of the housing, and wherein the housing further includes a lip extending downwardly from a top wall of the housing to prevent the drawer from being accidentally pulled out of the housing.

\* \* \* \* \*